(12) United States Patent
Suryavanshi

(10) Patent No.: US 12,728,995 B2
(45) Date of Patent: Sep. 8, 2026

(54) USE OF CRAFT CHARACTERISTICS FOR MANAGEMENT AND CONTROL OF MEDIA IN A TRANSPORT CRAFT

(71) Applicant: VIASAT, INC., Carlsbad, CA (US)

(72) Inventor: Vijay A. Suryavanshi, Mumbai (IN)

(73) Assignee: VIASAT, INC., Carlsbad, CA (US)

( * ) Notice: Subject to any disclaimer, the term of this patent is extended or adjusted under 35 U.S.C. 154(b) by 41 days.

(21) Appl. No.: 18/827,609

(22) Filed: Sep. 6, 2024

(65) Prior Publication Data

US 2024/0425179 A1 Dec. 26, 2024

Related U.S. Application Data

(63) Continuation of application No. PCT/US2022/019389, filed on Mar. 8, 2022.

(51) Int. Cl.
*B64D 11/00* (2006.01)
*G01G 19/07* (2006.01)
*G06Q 30/04* (2012.01)

(52) U.S. Cl.
CPC ......... *B64D 11/0015* (2013.01); *G01G 19/07* (2013.01); *G06Q 30/04* (2013.01)

(58) Field of Classification Search
None
See application file for complete search history.

(56) References Cited

U.S. PATENT DOCUMENTS 8,509,990 B2 8/2013 Bennett et al.
9,251,391 B2 2/2016 Surkau et al.
11,228,789 B2 * 1/2022 Watson .................... H04W 4/42
11,492,119 B1 * 11/2022 Watson .............. B64D 11/0015
11,641,501 B2 * 5/2023 Demange ......... H04N 21/26241 725/64
2005/0182557 A1 * 8/2005 Smith .................... G06Q 10/10 701/120
2005/0278754 A1 * 12/2005 Bleacher .......... H04N 21/41422 725/77

(Continued)

FOREIGN PATENT DOCUMENTS

CA 3172083 A1 * 9/2021 .............. H04W 4/42
CN 114043988 A * 2/2022 ............ B60W 40/09

(Continued)

*Primary Examiner* — Fekadeselassie Girma

(74) *Attorney, Agent, or Firm* — HOLZER PATEL DRENNAN

(57) ABSTRACT

Management of media content delivery on a transport craft based on a craft characteristic of the transport craft that is indicative of a number of passengers aboard the craft. The craft characteristic may be generated by one or more sensors or other means to provide data regarding an estimated or actual number of passengers aboard the transport craft. The craft characteristic may be communicated to an on-board content management system (CMS) such that control of delivery of media content to client devices on-board the transport craft is based on the craft characteristic. In examples, the craft characteristic may also be provided to a ground system for use in control of a communication network providing media content to the craft. In addition, the craft characteristic may also be used for real-time billing or other purposes.

11 Claims, 7 Drawing Sheets

(56) References Cited

U.S. PATENT DOCUMENTS

| | | | | |
|---|---|---|---|---|
| 2010/0079342 | A1* | 4/2010 | Smith | G01H 17/00 342/450 |
| 2015/0077556 | A1* | 3/2015 | Reed | H04N 7/183 348/148 |
| 2017/0066534 | A1 | 3/2017 | Sharma | |
| 2019/0014371 | A1 | 1/2019 | Couleaud et al. | |
| 2019/0265703 | A1* | 8/2019 | Hicok | B60W 60/00253 |
| 2023/0388787 | A1* | 11/2023 | Wilson | H04L 9/0825 |

FOREIGN PATENT DOCUMENTS

| | | | |
|---|---|---|---|
| WO | 2006122332 | A3 | 2/2007 |
| WO | 2021002857 | A1 | 1/2021 |
| WO | 2022039737 | A1 | 2/2022 |

* cited by examiner 500
516
512
514
516
520
510
518
516
Ground System
530

USE OF CRAFT CHARACTERISTICS FOR MANAGEMENT AND CONTROL OF MEDIA IN A TRANSPORT CRAFT

FIELD

The present disclosure generally relates to communication systems for mobile transport craft. More particularly, the present disclosure relates to delivery and control of media content delivery to passengers aboard a mobile transport craft BACKGROUND It is becoming increasingly common for users to desire to consume streaming media while in transit (e.g., on mobile devices, like mobile phones, laptop computers, tablet computers, integrated media terminals, or other in-transport terminals), for example while in airplanes, busses, cruise ships, or other transport craft. Such media consumption can be very data-intensive and can place large burdens on resources of communications networks used to deliver communications services to the transport craft. For example, when many passengers desire to consume streaming media on board an aircraft, there may be insufficient network capacity (e.g., via a satellite network link to the aircraft) to provide all the desired media to all those passengers' devices.

Conventionally, many transport service providers seek to address this concern by storing media content local to (i.e., on-board) the transport craft, and allowing passengers only to access the on-board content. For example, the passengers can consume television programs, movies, and/or other types of media content through wired and/or wireless networks on-board the transport craft, without using any network capacity to stream the media from off-board sources. In some such approaches, passengers can only use off-board network capacity for lower-data applications (e.g., email, text messaging, etc.). In other such approaches, passengers are disincentivized from using off-board network capacity, for example, by being charged a fee; or only certain classes of passenger are provided with off-board network access. While such approaches can help minimize the amount of off-board network capacity being used by passengers, such approaches tend to appreciably limit passenger access to off-board media content. As such, conventional approaches often strike a poor balance between minimizing network resource usage and maximizing customer satisfaction.

SUMMARY

Examples in the present disclosure provide techniques for control of an on-board content management system (CMS) based on a craft characteristic that is indicative of a number of passengers aboard a transport craft. The craft characteristic may be sensed or otherwise generated by a variety of means such as, for example, the weight of the transport craft. The craft characteristic may be used to control the on-board CMS to, for example, initiate or halt the delivery of media content to client devices. Accordingly, resources such as network bandwidth, power, or other resources dedicated to providing and presenting the media content to the passenger may be conserved or otherwise managed in view of the craft characteristic. In addition, the craft characteristic may be communicated to a ground system in real time (e.g., during the passage of the transport craft from source to destination) for use by the ground system. For example, the ground system may provide real time billing information and/or may control aspects of a communication system in communication with the transport craft based on the craft characteristic.

According to one example, an on-board media system disposed on a transport craft is provided. The system includes an on-board network interface subsystem disposed on the transport craft to communicate via an on-board communication network with a plurality of client devices on the transport craft. The system also includes an on-board content management system (CMS) operative to provide the media data to the plurality of client devices via the on-board network interface subsystem. A sensor is operative to measure a craft characteristic that is indicative of a number of passengers aboard the transport craft. In turn, the on-board CMS controls one or more characteristics of the media content based on the craft characteristic.

According to another embodiment, a method is provided for control of an on-board media system disposed on a transport craft. The method includes measuring a craft characteristic that is indicative of a number of passengers aboard the transport craft. The method also includes controlling an on-board content management system (CMS) to control providing media data to a plurality of client devices via an on-board network interface subsystem.

BRIEF DESCRIPTION OF THE DRAWINGS

The accompanying drawings, referred to herein and constituting a part hereof, illustrate embodiments of the disclosure. The drawings together with the description serve to explain the principles of the invention.

FIG. 5 shows an example transport craft in which a craft characteristic may be generated from on-board or off-board sensors or the like.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

The present disclosure generally relates to control of the delivery of media content to passengers aboard a transport craft based on a collective craft characteristic that is indicative of a number of passengers aboard the craft. In this regard, media content playback via an on-board content management system (CMS) may be controlled at least in part based on the craft characteristic. For example, once the craft characteristics indicates that the number of passengers aboard the craft excess an activation threshold, the CMS may enable media playback to passengers aboard the craft. However, if the craft characteristics indicates that the number of passengers aboard the craft is not in excess an activation threshold, the CMS may disable media playback to conserve power and network resources.

In further examples, the craft characteristic may be provided to a ground system of a communication system to control aspects of the communication network in communication with the craft. For example, allocation of network resources used to communicate with the craft may be at least in part based on the craft characteristic that is indicative of the number of passengers aboard the craft. Further still, the craft characteristic that is indicative of a number of passengers aboard the craft may be provided to a ground system for real-time analytics of the information (e.g., for billing or other administrative purpose).

The craft characteristic may be determined by a sensor provided with or in observation of the transport craft. For instance, a craft weight may be monitored, which may be correlated to an indicated number of passengers aboard the transport craft. For example, the Aeronautical Radio, Incorporated (ARINC) Standard provides a mechanism to gauge the weight of an aircraft while on the ground. In this regard, ARINC data provided according to the ARINC standard (e.g., including aircraft weight or some other measure) may comprise the craft characteristic. Other sensors on-board or off-board the transport craft may additionally or alternatively provide data for use in determining the craft characteristic.

As will be described in greater detail below, the craft characteristic may be used in conjunction with one or more passenger parameter. For instance, the passenger parameter may be indicative of an individual passenger's presence. As such, a plurality of passenger parameters indicative of the presence of a collective number of passengers may be used in determining a craft characteristic indicative of the number of passengers aboard the transport craft.

Figure 1:
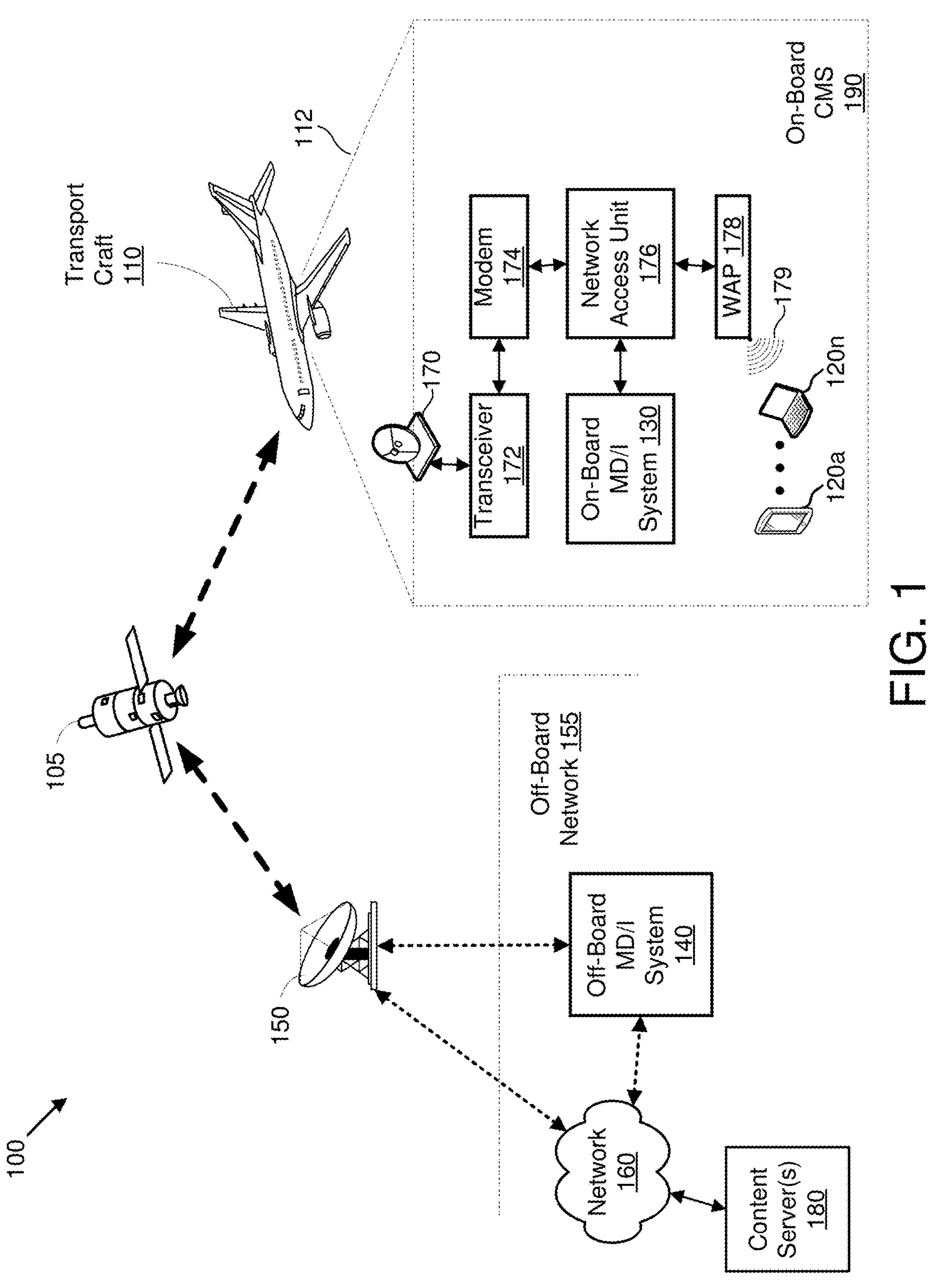
FIG. 1 shows a simplified diagram of an example satellite communications system, which provides a context for various embodiments.

FIG. 1 shows a simplified diagram of an example satellite communications system 100, which provides a context for various embodiments described herein. Many other configurations are possible having more or fewer components than the satellite communications system 100 of FIG. 1. In the illustrated example, the satellite communications system 100 is being used to provide communications services between an off-board network 155 and one or more transport craft 110. For example, the transport craft(s) 110 can include airplanes, trains, buses, cruise ships, etc.; and any or all such transport craft(s) 110 can communicate via any one or more suitable communications architecture(s) including any suitable communications links, such as satellite communications systems, air-to-ground communication systems, hybrid satellite and air-to-ground communications systems, cellular communications systems, etc. Further, while illustrated as a satellite communications system, examples can operate in context of cellular communications systems, and/or any other suitable long-range wireless communications system. For example, as described with reference to FIG. 2 below, portions of the illustrated satellite communications system 100 (e.g., the satellite 105 and the gateway 150) can be one illustrative implementation of one or more intermediary networks that provide connectivity between the off-board network 155 and one or more transport craft 110 (and/or client devices 120 disposed thereon).

Each transport craft 110 can be used to transport one or more passengers, and the satellite communications system 100 can be used to deliver media content to the passengers on board the transport craft 110. In turn, the transport craft 110 may be equipped with an on-board content management system (CMS) 190. Passengers can consume media while on board the transport craft 110 using any suitable type of client device 120. Some client devices 120 can include personal mobile devices, such as smart phones, laptop computers, tablet computers, and the like. Other client devices can include devices installed in the transport craft 110, such as seat-back media displays, shared cabin media displays, and the like. Using the client devices 120, passengers can access a graphical user interface that includes a media channel interface. The media channel interface graphically presents a number of media channel offerings to the passengers. By interacting with the media channel interface (e.g., by interacting with a touchscreen interface, a peripheral input/output device, a remote control, and/or any other user interface associated with a client device 120) a passenger can select any of the media channel offerings for viewing. The media channel offerings can include streamed media channel offerings and pre-positioned media channel offerings. Streamed media channel offerings generally include any media channel offerings being streamed to the transport craft 110, which can provide broadcast television content, on-demand media content (e.g., movies, television episodes, music videos, sports footage, etc.), dedicated media streams, and/or any other suitable content. The term "streamed" is used herein to refer to any suitable manner of communicating a media channel offering to the transport craft 110 via a network external to the transport craft 110 and concurrently with the media channel offering being consumed by one or more passengers, as opposed to the media channel offering being served from storage on-board the transport craft 110. Pre-positioned media channel offerings generally include those served from storage on-board the transport craft 110 (i.e., pre-positioned on the transport craft 110), which can include content segments (e.g., stored movies, television episodes, music videos, sports footage, trailers, advertisements, etc.), and/or any other suitable content.

The streamed media channel offerings can originate from one or more content servers 180. For example, the transport craft 110 can be in communication with an off-board network 155 via a satellite 105 and a gateway 150, and the off-board network 155 can include (or can be in communication with) the content server(s) 180 via one or more content network(s) 160 (e.g., the Internet). The gateway 150 can include, and/or be in communication with, an off-board media delivery and interface (MD/I) system 140. For example, the gateway 150 can be in direct communication with the off-board MD/I system 140, or in communication with the off-board MD/I system 140 via one or more networks (e.g., content network(s) 160). Nodes of the off-board network 155 can be in communication via any suitable types of networks and/or network links, such as the Internet, an IP network, an intranet, a wide area network (WAN), a local area network (LAN), a virtual private network (VPN), a virtual LAN (VLAN), a fiber optic network, a cable network, a public switched telephone network (PSTN), a public switched data network (PSDN), a public land mobile network, and/or any other type of network having wired and/or wireless (e.g., including optical) communications links.

As described herein, features of various examples can be enabled by interactions between the off-board MD/I system 140 and an on-board MD/I system 130 of the on-board CMS 190 disposed on the transport craft 110. Embodiments of the off-board MD/I system 140 and the on-board MD/I system 130 can include any suitable components, such as one or more media servers, media storage devices, etc. Functions and features of the off-board MD/I system 140 and the on-board MD/I system 130 can be implemented in hardware, instructions embodied in memory and formatted to be executed by one or more general or application-specific processors, firmware, or any combination thereof.

The on-board MD/I system 130 can be part of a two-way communication system 112 disposed on the transport craft 110 to facilitate bidirectional communication with the satellite 105. In the illustrated embodiment, the two-way communication system 112 also includes an antenna system 170, transceiver 172, modem 174, network access unit 176, and wireless access point (WAP) 178. The two-way communication system 112 can provide for reception of a forward downlink signal from the satellite 105 and transmission of a return uplink signal to the satellite 105 to support two-way data communications between the client devices 120 within the transport craft 110 and nodes of the off-board network 155 (e.g., the off-board MD/I system 140, the content server(s) 180, etc.). In addition to providing communications between the transport craft 110 and the satellite 105, the two-way communication system 112 can also facilitate communications with the client devices 120. For example, the client devices 120 can communicate with the network access unit 176 via a one or more on-board communication links 179, which can include any suitable wired and/or wireless communications links (e.g., and any other supporting components, such as logical and/or physical ports, etc.). The on-board communication links 179 can be, for example, part of a local area network such as a wireless local area network (WLAN) support by WAP 178. One or more WAPs 178 can be distributed about the transport craft 110, and can, in conjunction with network access unit 176, provide traffic switching and routing functionality; for example, as part of a WLAN extended service set (ESS), etc.

In operation, the network access unit 176 can provide uplink data received from the client devices 120 to the modem 174 to generate modulated uplink data (e.g., a transmit intermediate frequency (IF) signal) for delivery to the transceiver 172. The transceiver 172 can upconvert and amplify the modulated uplink data to generate the return uplink signal for transmission to the satellite 105 via the antenna system 170. Similarly, the transceiver 172 can receive the forward downlink signal from the satellite 105 via the antenna system 170. The transceiver 172 can amplify and downconvert the forward downlink signal to generate modulated downlink data (e.g., a receive IF signal) for demodulation by the modem 174. The demodulated downlink data from the modem 174 can be provided to the network access unit 176 for routing to the client devices 120. The various components of the two-way communication system 112 can be implemented in any suitable manner. For example, while shown as separate components, some or all components can be integrated into a single component (e.g., modem 174 can be integrated with network access unit 176), or segmented into additional components.

As described in more detail below, the on-board MD/I system 130 and/or the off-board MD/I system 140 can provide commands to the network access unit 176 to manage and distribute media channel offerings and to handle related media channel interface commands, with regard to the passengers' client devices 120. For example, it can be desirable to provide a highly satisfying media consumption experience for passengers by offering passengers a large variety of media options (or, at least, a reasonable number of highly relevant options), which can involve making a large variety of media channel offerings available for streaming to the client devices 120 on board the transport craft 110. However, concurrently streaming a large number of media channel offerings to the transport craft can consume an appreciable amount of bandwidth and/or other resources of the satellite communications system 100 (and/or other intermediary networks) servicing the transport craft 110. Accordingly, embodiments seek to maintain a high level of (and even increase) passenger satisfaction with the on-board media consumption experience, while reducing the amount of network capacity being used to provide the on-board media consumption experience. At least to that end, examples provide techniques for controlling the delivery of media channel offerings to passengers.

Specifically, the examples provided herein may utilize sensing of one or more passenger parameters that can be used to control the on-board MD/I system 130. For example, one or more sensors may be disposed at or within the transport craft 110. The one or more sensors may facilitate sensing of one or more passenger parameters. In an example, the WAP 178 may comprise sensing functionality to determine a passenger parameter of one or more passengers on board the transport craft 110. As noted above, the transport craft 110 may include a plurality of WAPs 178, which may be distributed about the transport craft 110. The WAPs 178 may coordinate to provide sensing of passenger parameters. Alternatively, a given WAP 178 may monitor one or more passengers in the vicinity of the given WAP 178 to provide passenger parameters for those passengers in the vicinity of the given WAP 178. In an example, the WAP 178 may implement an IEEE 802.11 protocol for providing sensing of one or more passengers on board the transport craft 110 (e.g., IEEE 802.11bf or other IEEE 802.11 protocol that provides sensing capability). In other examples, a count of client devices that are connected to a WAP 178 may be provided to estimate a number of passengers aboard the craft.

Figure 2:
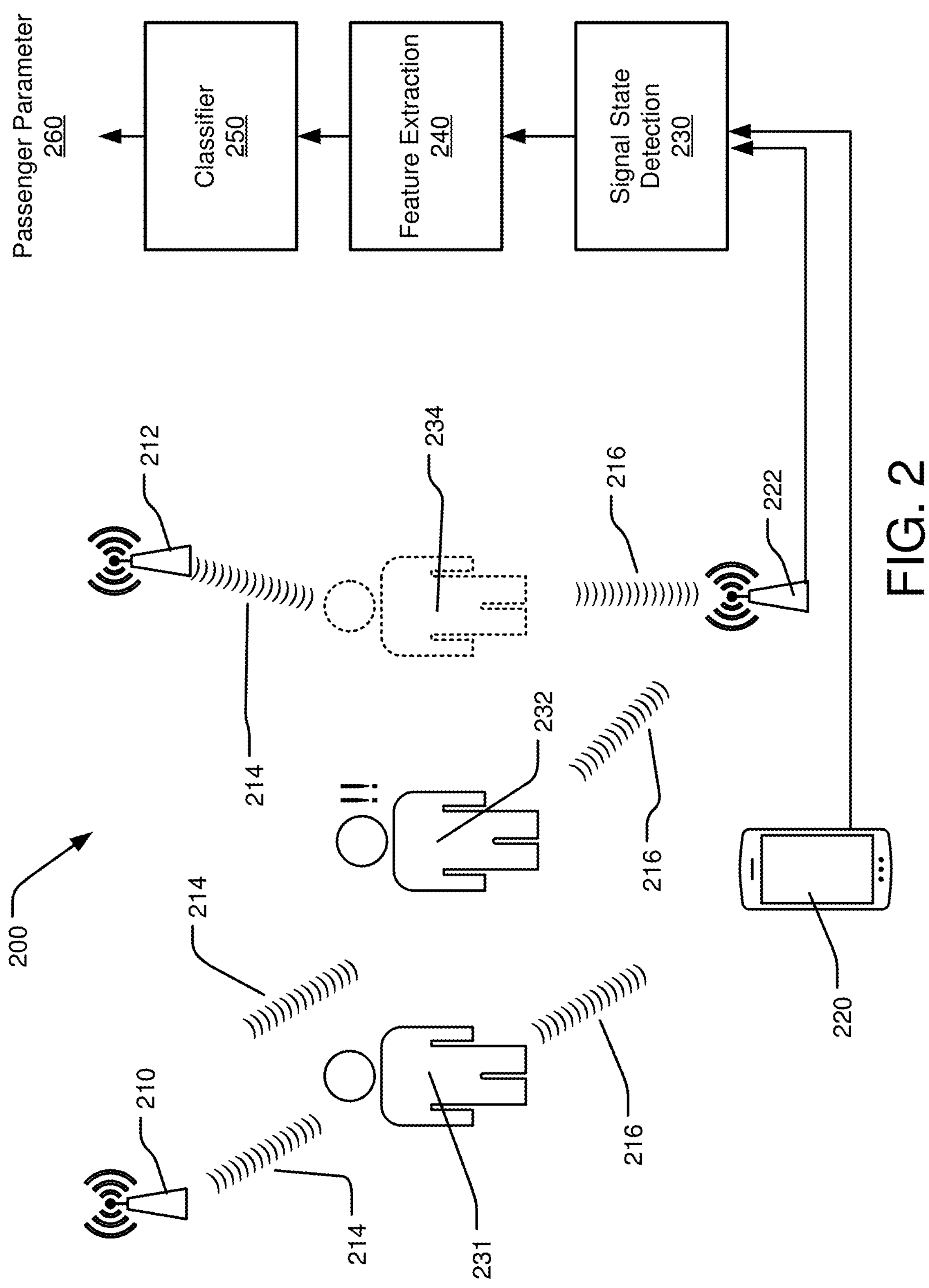
FIG. 2 shows an example environment in which one or more network access devices may employ sensing to generate one or more passenger parameters.

With further reference to FIG. 2, an environment 200 that may be monitored using Wi-Fi sensing to detect a passenger parameter 260 is shown. In some examples, the passenger parameter 260 may include passenger presence. In turn, the number of passengers detected via passenger presence sensing may be used to generate the craft characteristic. The environment 200 may include a plurality of wireless access points including access point 210, access point 212, and access point 222. In addition, one or more client devices 220 may also be utilized. In the environment 200, one or more of the access points including access point 210 and access point 212 may generate a transmitted Wi-Fi signal 214. In turn, received Wi-Fi signals 216 may be received by another access point 222 and/or a client device 220.

As the transmitted Wi-Fi signals 214 traverse the environment 200, the characteristic of the transmitted Wi-Fi signal 214 may be altered prior to being received as received Wi-Fi signal 216. For instance, the transmitted Wi-Fi signals 214 may be altered by one or more passengers in the environment 200. As an example, passenger presence such as the presence of passenger 231 may be detected. In addition, passenger health monitoring may be utilized to detect one or more passenger health parameters of an ailing passenger 232. Also, passenger demographic data regarding passenger 231 or passenger 232 may be generated. Furthermore, the absence of a passenger 234 may also be detected such as the lack of a passenger in a designated passenger area such as a seat or the like.

The detection of the passenger characteristics described above may be provided by utilizing signal state detection of the received Wi-Fi signals 216. That is, information regarding the received Wi-Fi signals 216 may be provided by the receiving devices such as the client device 220 and the network access point 222. Detected states of the received Wi-Fi signals 216 may include detection of phase shifts, frequency shifts, Doppler shifts, amplification shifts, signal time-of-flight, or other signal states related to changes in the received Wi-Fi signals 216 relative to the transmitted Wi-Fi signals 214. The signal state information may be detected by a signal state detection module 230. Upon detection of signal state information, the signal state information may be provided to a feature extraction module 240. The feature extraction module 240 may utilize the signal state information to identify features from the signal state information. In turn, the features may be extracted based on the signal state information. Data regarding the extracted features may be provided to a classifier module 250. The classifier module 250 may employ an algorithmic approach to provide classification including classifications of passenger presence, human activity recognition (e.g., gesture detection), passenger health parameters, or passenger demographic detection. In turn, the classifier module 250 may output one or more passenger parameters 260 that may provide descriptive information regarding one or more of the passenger 231, the passenger 232, or an absence of a passenger 234. The signal state detection module 230, feature extraction module 240, and/or classifier module 250 may be provided on-board the transport craft. In an example, the signal state detection module 230, feature extraction module 240, and/or classifier module 250 may be incorporated with a network access point 222 or an onboard MD/I system 130 (as described in relation to FIG. 1).

Figure 3:
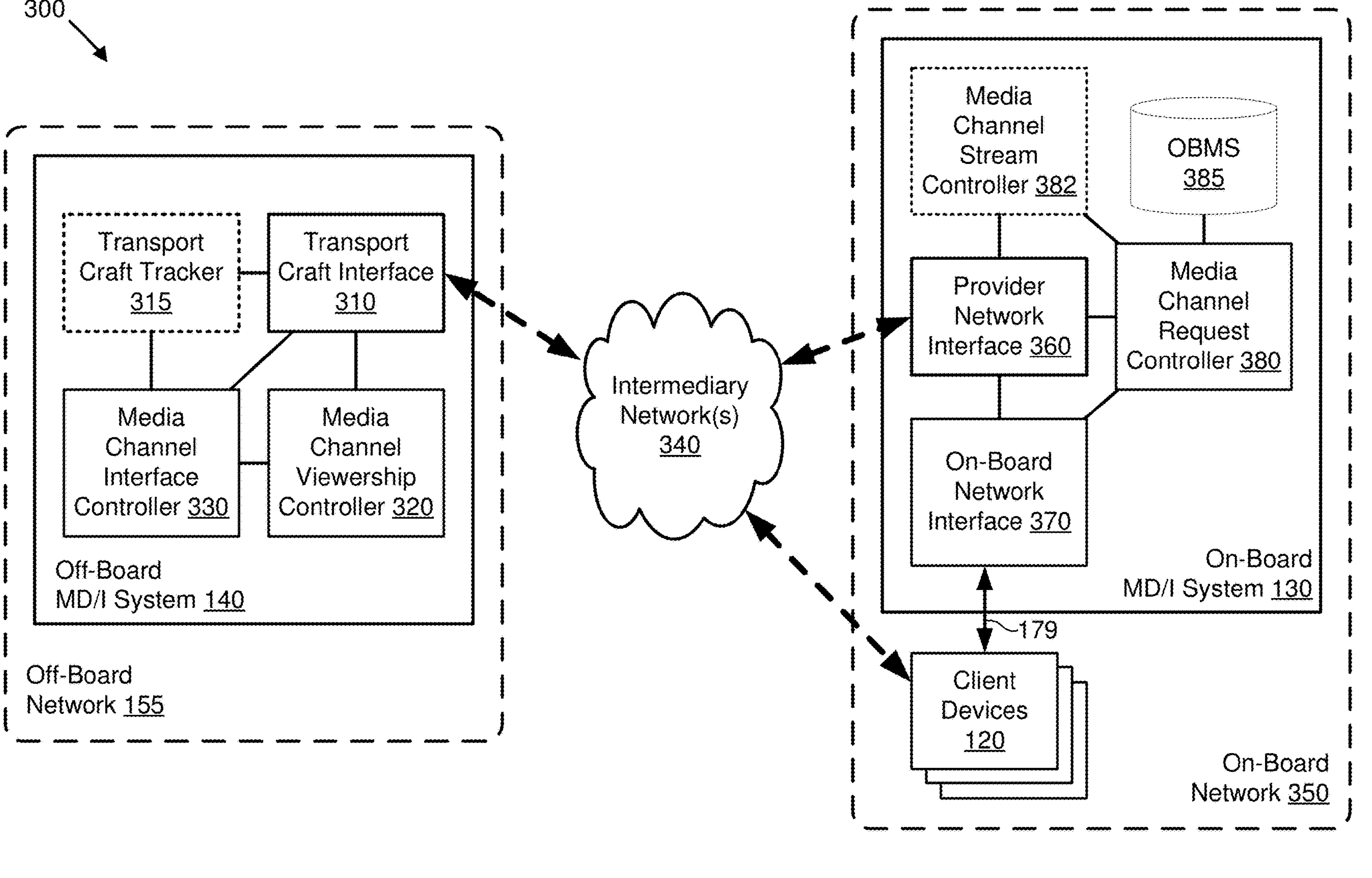
FIG. 3 shows a simplified diagram of a portion of a communications system having an off-board network in communication with on-board networks via one or more intermediary networks, according to various embodiments.

FIG. 3 shows a simplified diagram of a portion of an example of a communications system 300 having an off-board network 155 in communication with on-board networks 350 via one or more intermediary networks 340. The communications system 300 can be an implementation of the communications system 100 described with reference to FIG. 1. The one or more intermediary networks 340 can include any suitable communications links and architectures, such as any suitable wired and/or wireless links, public and/or private networks, etc. Typically, because of the mobile nature of the transport craft 110, the one or more intermediary networks 340 will likely involve at least one long-range wireless communications link. The at least one long-range wireless communications link can include one or more satellite communications links (e.g., as shown in FIG. 1), one or more cellular communications links, and/or any other suitable wireless communications link(s). Such wireless links can be generally referred to as "carriers," which can operate in any suitable one or more frequencies, phases, polarizations, etc.; which may or may not overlap. In one implementation, the one or more intermediary networks 340 include a multi-carrier satellite communications network that serves a large service area made up of multiple spot beam coverage areas. In such a multi-carrier communications network, as the transport craft 110 moves through the communications network, it can move through multiple carrier coverage areas; so that communications services can be provided to the transport craft 110 (and/or to client devices 120 on board the transport craft 110) via different carriers over time. For example, during a transatlantic or international airplane flight, the airplane, and the client devices 120 of passengers on the airplane, may move through a number of carrier coverage areas, and the different carriers servicing those coverage areas can be used over time to maintain communications with the transport craft 110 over a large geographic region covered during transport (e.g., the traversed region is larger than a single carrier coverage area), and/or to provide other features, such as facilitating load balancing across multiple carriers, grouping of terminals by carrier, etc.

Each on-board network 350 is disposed in a transport craft 110 (e.g., as shown in FIG. 1), and a single transport craft 110 can have more than one on-board network 350 disposed thereon. Each on-board network 350 can include at least one on-board MD/I system 130 by which to provide media services (e.g., and other communications services in some cases) to some or all of the client devices 120 of passengers on board the transport craft 110. Some implementations of the on-board network 350 facilitate connectivity between the client devices 120 and the intermediary network(s) 340 via components of the on-board MD/I system 130 via one or more on-board communication links 179 (e.g., wired and/or wireless links). Additionally or alternatively, some implementations of the on-board network 350 facilitate connectivity between the client devices 120 and the intermediary network(s) 340 without passing through components of the on-board MD/I system 130 (e.g., the client devices 120 are in communication with the intermediary network(s) 340 via the WAP 178, network access unit 176, modem 174, transceiver 172, and antenna system 170 of FIG. 1). Accordingly, for the sake of simplicity, the client devices 120 and the on-board MD/I system 130 are both shown as part of the on-board network 350.

The off-board network 155 can include any suitable components disposed in any suitable location or locations; such that the off-board network 155 is remote from the transport craft 110, but able to be in communication with the on-board networks 350 of the transport craft 110. The off-board network 155 can include at least one off-board MD/I system 140 by which to provide media services (e.g., and other communications services in some cases) to some or all of the transport craft 110. Though not shown, embodiments of the off-board network 155 can include, and/or be in communication with, one or more content servers 180 (e.g., via one or more content networks 160). As described with reference to FIG. 1, some implementations of the off-board network 155 facilitate connectivity between the content servers 180 and the intermediary network(s) 340 via components of the off-board MD/I system 140. Additionally or alternatively, some implementations of the off-board network 155 facilitate connectivity between the content servers 180 and the intermediary network(s) 340 without passing through components of the off-board MD/I system 140 (e.g., some or all of the content servers 180 are in communication with the intermediary network(s) 340 via the content networks 160 of FIG. 1).

As noted above, features of various embodiments can be enabled by interactions between the off-board MD/I system 140 and the on-board MD/I systems 130 disposed on the transport craft 110. The off-board MD/I system 140 can include a transport craft interface 310, a media channel viewership controller 320, and a media channel interface controller 330. Embodiments of the transport craft interface 310 can facilitate communications between the off-board MD/I system 140 and the intermediary networks 340, thereby also facilitating communications between the off-board MD/I system 140 and client devices 120 on board the transport craft 110. The transport craft interface 310 can include any suitable components for communicatively interfacing with the intermediary networks 340, such as one or more antennas, transceivers, amplifiers, filters, switches, routers, wired and/or wireless ports, components to implement one or more communications protocols, etc.

Embodiments of the media channel viewership controller 320 can be communicatively coupled with the transport craft interface 310 to receive media viewership signals from the client devices 120. The media viewership signals can be received from the client devices 120 and/or from the on-board MD/I system 130. The media viewership signals can indicate viewership, by the client devices 120, of the multiple media channel offerings that are selectable for viewing via adaptive on-board media channel interfaces displayable on each of the client devices 120. For example, when a passenger desires to view media while on board the transport craft 110, the passenger can use a client device 120 (e.g., a personal device, such as a smart phone, laptop computer, tablet computer, etc.; or a provided device, such as a seat-back media display) to access one or more media channel interfaces. The media channel interfaces can graphically display a listing of available media channel offerings that can be selected by the passenger via the interface (e.g., by interacting with a touchscreen interface). In one implementation, the media channel interface includes an array of icons, each representing a selectable media channel offering. In another implementation, the media channel interface includes a grid-type listing of available media channel offerings (e.g., similar to an electronic program guide). In another implementation, the media channel interface includes a text-only listing of available media channel offerings. In some implementations, the media channel interface can include additional navigation features, such as interface controls (e.g., virtual touchscreen buttons) for sorting displayed media channel offerings, filtering displayed media channel offerings, categorizing media channel offerings (e.g., using tabs, sub-menus, etc.), etc.

Figure 4:
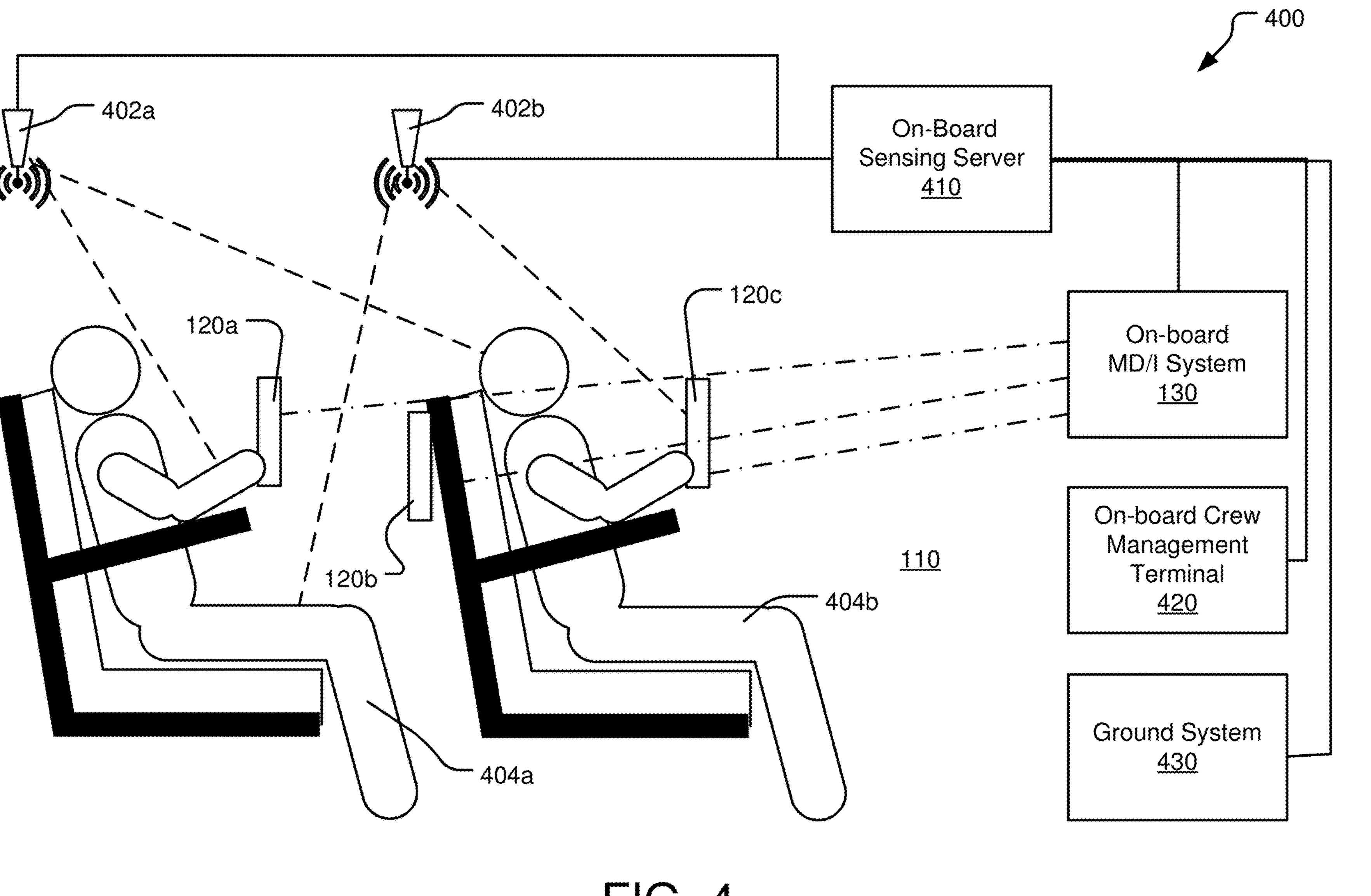
FIG. 4 shows an example of a portion of a passenger cabin of a transport craft in which wireless access points are employed to determine a passenger parameter for control of an on-board CMS.

FIG. 4 illustrates an example environment 400 in which sensing one or more passenger parameters may be used to provide feedback for control of media content to one or more client devices. A passenger 404*a* and a passenger 404*b* are shown on board a transport craft 110. It may be appreciated that the principals of operation described for the environment 400 may be extended to fewer or additional passengers 404 without limitation. Passenger 404*a* may be associated with one or more client device such as client device 120*a* and client device 120*b*. In this example, client device 120*a* may be a personal device of passenger 404*a* that may be brought on board by the passenger 404*a*. Alternatively, client device 120*a* may be provided to passenger 404*a* upon boarding the transport craft 110. Client device 120*b* may be a seat-back device positioned relative to a seat of passenger 404*a* such that passenger 404*a* may view and interact with the client device 120*b*. Passenger 404*b* may be associated with a client device 120*c*.

The transport craft 110 may include a WAP 402*a* and a WAP 402*b* disposed in the cabin of the transport craft 110. As noted above, WAP 402*a* and WAP 402*b* may be configured to provide monitoring of passenger 404*a* and/or passenger 404*b*. WAP 402*a* and/or WAP 402*b* may be provided with a protocol for sensing one or more passenger parameters for passenger 404*a* and/or passenger 404*b*.

In turn, WAP 402*a* and WAP 402*b* may be in operative communication with a on-board sensing server 410. WAP 402*a* and/or WAP 402*b* may provide a signal to the on-board sensing server 410 that is indicative of a passenger parameter for passenger 404*a* and/or passenger 404*b*. In this regard, the WAPs 402 may process measured signals to determine a passenger parameter or may pass measured signal information to the on-board sensing server 410, which may process the measured signal information into one or more passenger parameters.

The on-board sensing server 410 may be in further operative communication with an on-board MD/I system 130. As shown in FIG. 3, the on-board MD/I system 130 may communicate with the client device 120*a*, client device 120*b*, and/or client device 120*c* to provide media content to the respective client devices 120. As will be discussed in greater detail below, the provision or control of media content to the client devices 120 may be at least in part based on sensed passenger parameters for the passenger 404 associated with a given client device 120.

The passenger parameter may include one or more informational items related to, for example, a passenger presence, a passenger gesture, one or more passenger health parameters, or passenger demographic data. In relation to a passenger presence, the WAPs 402 may be able to discern whether passenger 404*a* is located in a seat associated with the passenger 404*a*. Thus, the passenger parameter may include an indicator of passenger presence based on whether a passenger 404 is present in a given location (e.g., an assigned seat for the passenger 404) or whether a passenger 404 is not present in a given location. Furthermore, the passenger presence parameter may include a location of a passenger 404 within the transport craft 110. For instance, designated areas may be provided within the transport craft 110 such that a passenger's presence in an area may be designated by the passenger presence parameter. Such designated areas may include an assigned seat for a passenger 404, a lounge area, a lavatory, a common area, or other designated area defined relative to the transport craft.

The passenger parameter may also include monitoring of a passenger 404 for one or more passenger gestures. For example, a passenger 404 may raise their hand, which may be detected by the WAP 402*a* and/or WAP 402*b*. Such a gesture may indicate a passenger 404 is requesting assistance from the crew of the transport craft 110. Other gestures, including those associated with control of playback of media content at a client device 120 may also be monitored. A passenger gesture may also certain movements of the passenger such as standing, bending at the waist, head movements, arm movements, leg movements, or other activities of the passenger. The passenger parameter may also include one or more passenger health parameters. For instance, the WAP 402*a* and/or the WAP 402*b* may monitor passenger 404*a* and/or passenger 404*b* for heart rate, respiratory rate, temperature, blood pressure or other health related parameters. The passenger parameter may also include demographic data of the passenger. For instance, a size of the passenger 404 may be determined to estimate an age of the passenger 404. Further still, a passenger's gender may be identified as passenger demographic data.

A passenger parameter may be utilized to provide information regarding a given passenger 404 on board the transport craft 110 or collective passenger parameters for a plurality of passengers 404 may be provided. In the foregoing instance, information such as the presence of the given passenger 404, a gesture of the given passenger 404, or health parameters of a given passenger 404 may allow for feedback or control of transport craft systems specific to the given passenger 404. However, in other instances, the collective passenger parameters may also be provided to help determine a craft characterization that is indicative of a number of passengers aboard the transport craft 110 or actions based on the passenger parameters for a plurality of passengers. Accordingly, the collective passenger parameters regarding a plurality of passengers 404 may include a craft characteristic indicative of a number of total passengers on board the transport craft 110, a number of awake passengers 404 at any given time, collective demographics data for the passengers on board a transport craft 110, or other collective data that describes or characterizes a plurality of passengers.

As noted above, the on-board sensing server 410 may be in operative communication with an on-board MD/I system 130. Thus, control of the MD/I system 130 may be at least in part based on one or more passenger parameters sensed for the transport craft 110. For instance, media content delivery to a given client device 120 may be initiated and/or halted based on a passenger parameter for a passenger 404 associated with the client device 120. As an example, passenger 404*a* may leave their assigned seat to move to another area of the transport craft 110 such as a lounge area or a lavatory. In turn, In any regard, on-board sensing server 410 may also be in operative communication with an on-board crew management terminal 420 and/or a ground system 430. In relation to the ground system 430, the on-board sensing server 410 may provide data to the modem 174 and transceiver 172 as shown in FIG. 1 for communication of passenger parameter data via a satellite communication system 100 or other communication link of the transport craft 110. Accordingly, one or more passenger parameters may also be provided to the on-board crew management terminal 420 and/or the ground system 430. In the case of the on-board crew management terminal 420, a passenger parameter may be provided to alert the crew of the transport craft 110 to a passenger activity or need. Examples may include passing a passenger parameter comprising a passenger gesture to the on-board crew management terminal 420 to signal a passenger calling for assistance of the crew. Other examples include the on-board crew management terminal 420 providing a warning to the crew of the transport craft 110 based on a passenger parameter (e.g., based on a passenger health parameter indicating a passenger 404 requires medical attention, a passenger parameter indicating that a passenger 404 is in an unauthorized area, a passenger parameter indicating that a passenger 404 is not complying with safety regulations, etc.).

In addition, the ground system 430 may receive one or more passenger parameters. Such ground system 430 may include a portion of a control segment of one or more communication links for the transport craft 110. As such, the control segment may control a configuration of the communication link based on one or more passenger parameter. For instance, a collective passenger parameter indicating a total number of passengers on board a transport craft 110 may be provided to the control segment for use in tailoring one or more of the links based on the number of passengers and, correspondingly, an anticipated bandwidth requirement for the passengers on board. Additionally or alternatively, the ground system 430 may include an invoicing module that may be used to provide real-time feedback (i.e., during a given passage of a transport craft 110) of a number of passengers on board the transport craft 110 to forecast invoicing and/or revenue projections, which may be based on a number of passengers on board or a utilization figure for one or more of the communication links.

Figure 5:
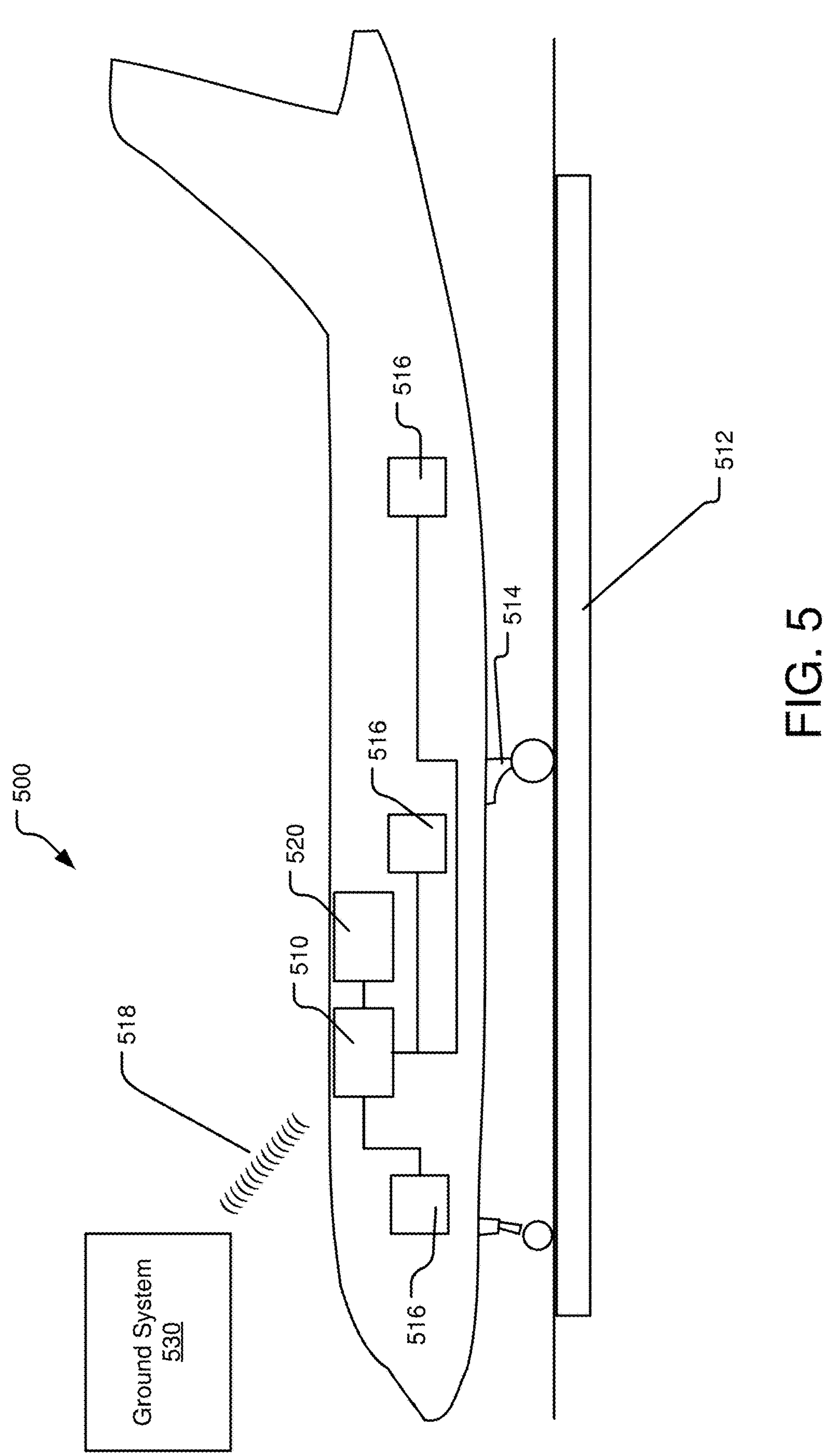

With further reference to FIG. 5, one example of a transport craft 500 for which a craft characteristic may be generated is shown. The transport craft 500 may include an on-board craft characteristic server 510. The on-board craft characteristic server 510 may be in operative communication with an on-board CMS 520 to facilitate enabling, disabling, or otherwise controlling the on-board CMS 520. The on-board craft characteristic server 510, as described above, may also receive one or more passenger parameters from WAPs, other onboard sensors, or an on-board sensing server 410.

The on-board craft characteristic server 510 may also include or be in operative communication with other on-board or off-board sensors that may be used to help determine a craft characteristic indicative of a number of passengers aboard the transport craft 500. For instance, one example of an off-board sensor may comprise a scale 512 that may determine a weight of the transport craft 500. The weight of the transport craft 500 may be correlated to an indicated number of passengers aboard the transport craft 500. Further still, a load sensor 514 or other weight determining device may be provided on-board the transport craft 500 such as in one or more gears, wheels, axles, or other component. In any regard, the load sensor 514 may be operative to determine a weight of the transport craft 500, which may be used to generate the craft characteristic indicative of the number of passengers aboard the transport craft 500. Further still, one or more on-board sensors 516 may be provided throughout the transport craft 500 to provide data for use in determining the craft characteristic indicative of the number of passengers aboard the transport craft 500. These on-board sensors 516 may be WAPs capable of sensing passenger presence as noted above. Additionally or alternatively, the on-board sensors 516 may include other types of sensors such as proximity sensors, scales, heat sensors, counters, or other sensors that may assist in determining the craft characteristic indicative of the number of passengers aboard the transport craft 500.

Once the craft characteristic indicative of the number of passengers aboard the transport craft 500 has been determined, the on-board craft characteristic server 510 may control the on-board CMS 520 based on the craft characteristic indicative of the number of passengers aboard the transport craft 500. For instance, as noted above, once the craft characteristic indicative of the number of passengers aboard the transport craft 500 exceeds an activation threshold, the on-board craft characteristic server 510 may enable the on-board CMS 520 to initiate delivery of media content to the passengers aboard the transport craft 500. Furthermore, if the craft characteristic indicative of the number of passengers aboard the transport craft 500 fails to exceed the activation threshold, the on-board CMS 520 may be disabled. For example, as passengers disembark the transport craft 500, the on-board CMS 520 may be disabled once the craft characteristic indicative of the number of passengers aboard the transport craft 500 falls below the activation threshold such that power and/or networking resources are conserved.

The on-board craft characteristic server 510 may also be in operative communication with a ground system 530. For instance, the on-board craft characteristic server 510 may communicate with the ground system 530 using the one or more communication links establishing communication with the transport craft 500. As such, the ground system 530 may receive the craft characteristic indicative of the number of passengers aboard the transport craft 500. The ground system 530 may include a portion of a control segment of one or more communication links for the transport craft 500. As such, the control segment may control a configuration of the communication link based on the craft characteristic indicative of the number of passengers aboard the transport craft 500. For instance, the craft characteristic indicative of the number of passengers aboard the transport craft 500 may be provided to the control segment for use in tailoring one or more of the links based on the number of passengers and, correspondingly, an anticipated bandwidth requirement for the passengers on board. Additionally or alternatively, the ground system 530 may include an invoicing module that may be used to provide real-time feedback (i.e., during a given passage of a transport craft 500) of a number of passengers on board the transport craft 500 to forecast invoicing and/or revenue projections, which may be based on a number of passengers on board or a utilization figure for one or more of the communication links.

Figure 6:
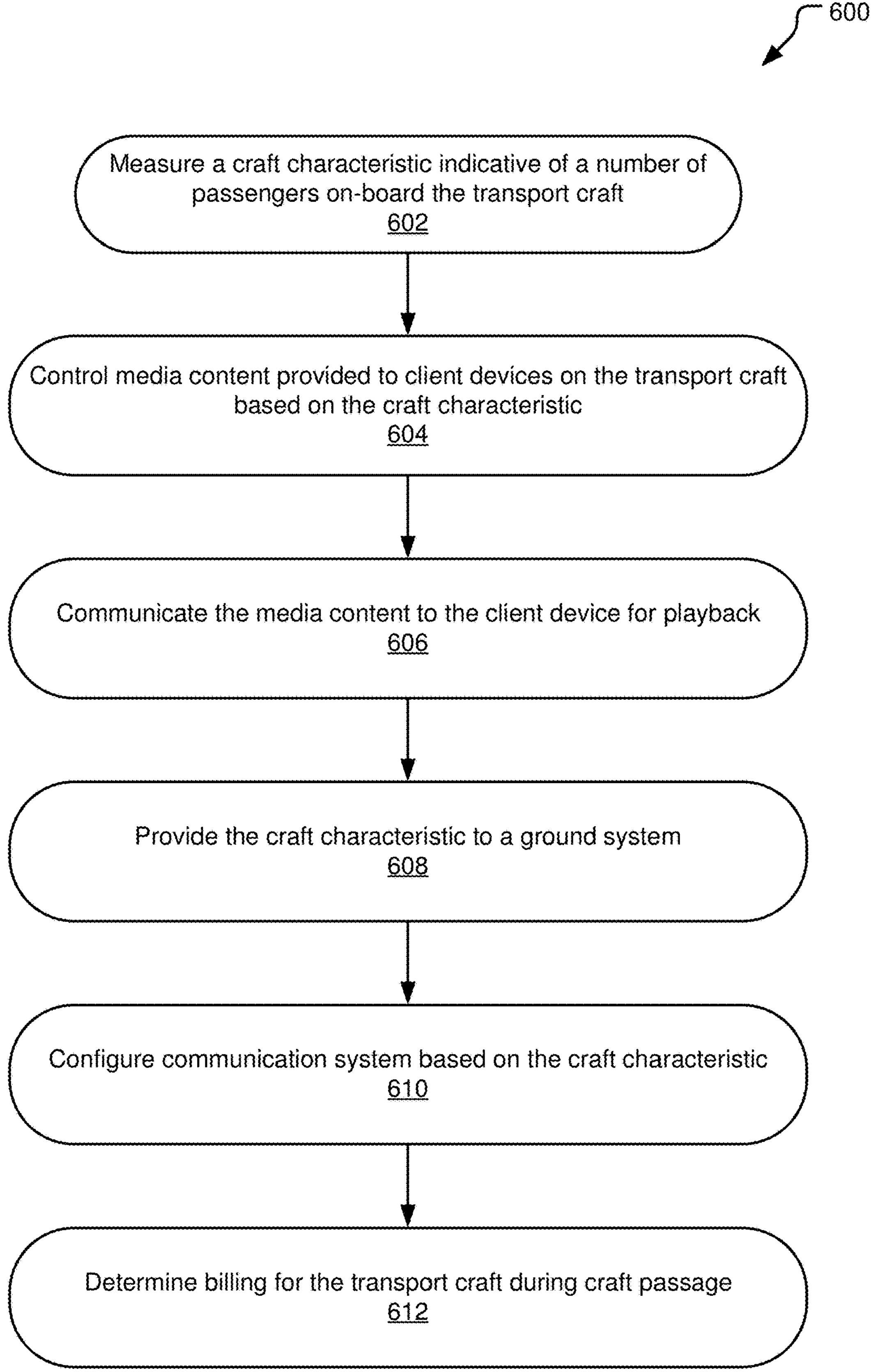
FIG. 6 illustrates example operations for management of the delivery of content to a client device based on a craft characteristic.

FIG. 6 depicts example operations 604 for use of a craft characteristic to control of the provision of media content to client devices on-board the transport craft. The example operations 600 including a measuring operation 602. In the measuring operation 602, a craft characteristic may be measured that is indicative of a number of passengers on-board the transport craft. As discussed in detail above, the craft characteristic may be measured using on-board sensors and/or off-board sensors. Examples of the measured craft characteristic may include a number of client devices connected to a wireless network of the transport craft, a weight of the transport craft, or some other measured characteristic that is indicative of a number of passengers on-board the transport craft. In this regard, it may be appreciated that the measuring operation 602 may include measuring a characteristic that may be correlated or otherwise related to a number of passengers on board the transport craft without actually counting a number of passengers on-board. However, the measuring operation 602 could additionally or alternatively include counting an actual number of passengers on-board the transport craft using sensors disposed on-board the aircraft or using off-board sensors.

In any regard, the example operations 600 may include a controlling operation 604 in which media content being provided to client devices on the transport craft may be controlled based on the craft characteristic. The controlling operation 604 may include initiation or cessation of the provision of media content to client devices on-board the transport craft. Additionally or alternatively, the identity of media content may be based on the craft characteristic. For example, during a boarding phase of a transport craft, safety or informational messaging may be provided until the craft characteristic indicates a threshold number of passengers has been exceeded, at which time the provision of entertainment media content may be initiated in addition to or as an alternative to the safety and information messaging. In turn, the operations 600 may include communicating operation 606 in which the media content may be communicated to client devices on-board the transport craft for playback of media content.

In addition, the example operations 600 may include a providing operation 608 in which the craft characteristic may be provided to a ground system or other entity remote from the transport craft (e.g., a communication gateway or the like). The provision of the craft characteristic in the providing operation 608 may include providing raw data measured for the craft characteristic, which may in turn be used to generate an indication of a number of passengers on board the transport craft. Alternatively, the providing operation 608 may include providing the indicated number of passengers on board the transport craft (e.g., with or without providing the raw data measured for the craft characteristic).

As discussed above, the ground system, once having received the craft characteristic, may utilize the craft characteristic in a number of respects. For instance, the example operations 600 may include a configuring operation 610 in which a communication system in communication with the transport craft may be configured based on the craft characteristic. As noted above, one example of this may be allocating network resources based on the indicated number of passengers on board the transport craft in view of the craft characteristic. Also, the example operations 600 may include a determining operation 612 in which billing information for the transport craft (e.g., associated with provision of media content) may be determined based on the craft characteristic. As the craft characteristic may be measured for the transport craft in substantially real-time, the determining operation 612 may provide such billing information for the transport craft during the passage of the transport craft between the source and destination of the transport craft.

Figure 7:
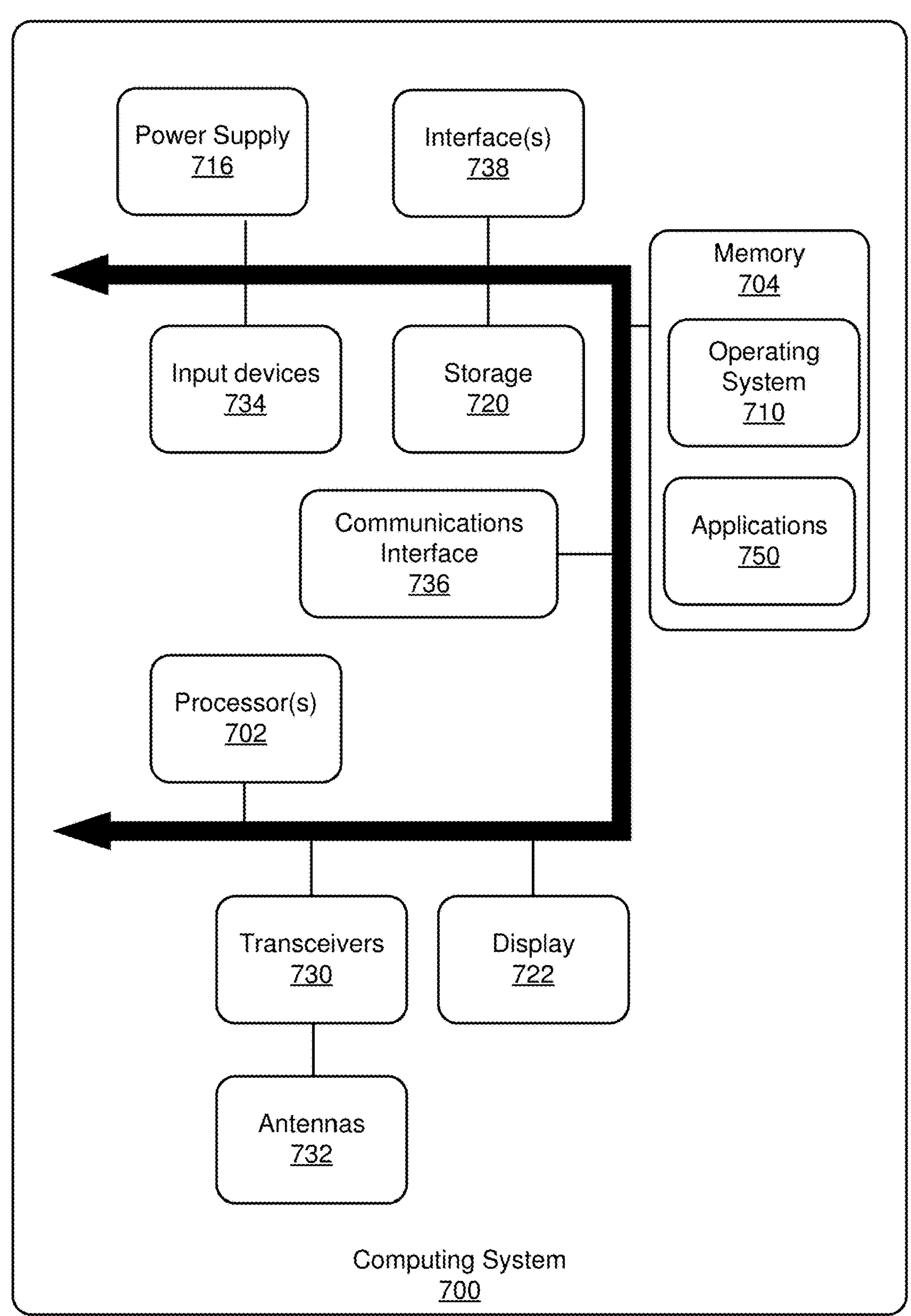
FIG. 7 illustrates an exemplary implementation of a computing system.

FIG. 7 illustrates an exemplary implementation of a computing system 700 for implementing the features and operations of the described technology. The computing system 700 may embody a remote-control device or a physical controlled device and is an example network-connected and/or network-capable device and may be a passenger/client device, such as a laptop, mobile device, desktop, tablet; a server/cloud device; an internet-of-things device; an electronic accessory; or another electronic device. The computing system 700 includes one or more processor(s) 702 and a memory 704. The memory 704 generally includes both volatile memory (e.g., RAM) and nonvolatile memory (e.g., flash memory). An operating system 710 resides in the memory 704 and is executed by the processor(s) 702. The computing system 700 may be an implementation of one or more of an off-board CMS, on-board systems, an on-board CMS, a signal state detector, a feature extraction module, a classifier, an on-board crew management terminal, a ground system, an on-board sensing server, a network access unit, a WAP, an on-board media system, a passenger/client device, an off-board communication network, and any of systems 100-400.

In an example computing system 700, as shown in FIG. 7, one or more modules or segments, such as applications 750, an on-board CMS, an off-board CMS, a signal state detector, a feature extraction module, a classifier, an on-board crew management terminal, a ground system, or an on-board sensing server are loaded into the operating system 710 on the memory 704 and/or storage 720 and executed by processor(s) 702. The storage 720 may include one or more tangible storage media devices and may store one or more passenger parameters or other data and be local to the computing system 700 or may be remote and communicatively connected to the computing system 700.

The computing system 700 includes a power supply 716, which is powered by one or more batteries or other power sources and which provides power to other components of the computing system 700. The power supply 716 may also be connected to an external power source that overrides or recharges the built-in batteries or other power sources.

The computing system 700 may include one or more communication transceivers 730, which may be connected to one or more antenna(s) 732 to provide network connectivity (e.g., mobile phone network, Wi-Fi®, Bluetooth®) to one or more other servers and/or passenger/client devices (e.g., mobile devices, desktop computers, or laptop computers). The computing system 700 may further include a network adapter 736, which is a type of computing system. The computing system 700 may use the adapter and any other types of computing systems for establishing connections over a wide-area network (WAN) or local-area network (LAN). It should be appreciated that the network connections shown are examples and that other computing systems and means for establishing a communications link between the computing system 700 and other devices may be used.

The computing system 700 may include one or more input devices 734 such that a user may enter commands and information (e.g., a keyboard or mouse). These and other input devices may be coupled to the server by one or more interfaces 738, such as a serial port interface, parallel port, or universal serial bus (USB). The computing system 700 may further include a display 722, such as a touch screen display.

The computing system 700 may include a variety of tangible processor-readable storage media and intangible processor-readable communication signals. Tangible processor-readable storage can be embodied by any available media that can be accessed by the computing system 700 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing system 700. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing systems.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

One general aspect of the present disclosure includes an on-board media system disposed on a transport craft. The system includes an on-board network interface subsystem disposed on the transport craft to communicate via an on-board communication network with a plurality of client devices on the transport craft. The system also includes an on-board content management system (CMS) operative to provide the media data to the plurality of client devices via the on-board network interface subsystem. The system further includes a sensor operative to measure a craft characteristic that is indicative of a number of passengers aboard the transport craft. The on-board CMS controls one or more characteristics of the media content based on the craft characteristic.

Implementations may include one or more of the following features. For example, the on-board CMS may be activated when the number of passengers aboard the transport craft exceeds an activation threshold. Additionally, the on-board CMS may be deactivated when the number of passengers aboard the transport does not exceed the activation threshold.

In an example, the sensor may obtain weight data regarding a craft weight. The craft weight being indicative of the number of passengers aboard the transport craft. In an example, the craft weight may be provided in connection with the ARINC standard. In another example, the sensor may include a passenger counter operative to determine the number of passengers aboard the transport craft.

In an example, the system may include a transmitter in communication with at least one communication network component for transmission of the craft characteristic that is indicative of the number of passengers aboard the transport craft to the at least one communication network component. In an example, a communication network may be controlled at least in part based on the craft characteristic that is indicative of the number of passengers aboard the transport craft. In this example, the communication network may be a satellite communication controller and the satellite commination system is controlled to allocate capacity of the satellite communication system to the transport craft based on the craft characteristic that is indicative of the number of passengers aboard the transport craft.

Additionally or alternatively, the at least one communication network component may include a billing module. In turn, billing information regarding provision of a communication network to the transport craft may be at least in part determined based on the craft characteristic that is indicative of the number of passengers aboard the transport craft.

Another general aspect of the present disclosure includes a method for control of an on-board media system disposed on a transport craft. The method includes measuring a craft characteristic that is indicative of a number of passengers aboard the transport craft and controlling an on-board content management system (CMS) to control providing media data to a plurality of client devices via an on-board network interface subsystem.

Implementations may include one or more of the following features. For example, the controlling may include activating the on-board CMS when the number of passengers aboard the transport craft exceeds an activation threshold. Additionally or alternatively, the controlling may include deactivating the on-board CMS when the number of passengers aboard the transport does not exceed the activation threshold.

In an example, the measuring comprises may include a craft weight, the craft weight being indicative of the number of passengers aboard the transport craft. Additionally or alternatively, the measuring may be performed by a sensor comprising a passenger counter operative to determine the number of passengers aboard the transport craft.

In an example, the method may include transmitting the craft characteristic that is indicative of the number of passengers aboard the transport craft to the at least one communication network component. Further still, the method may include controlling at least a portion of the communication network at least in part based on the craft characteristic that is indicative of the number of passengers aboard the transport craft. In this example, the communication network may be a satellite communication controller such that the controlling may include allocating capacity of the satellite communication system to the transport craft based on the craft characteristic that is indicative of the number of passengers aboard the transport craft.

Additionally or alternatively, the at least one communication network component may include a billing module. As such, the method may also include determining billing information regarding provision of a communication network to the transport craft at least in part based on the craft characteristic that is indicative of the number of passengers aboard the transport craft.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. An on-board media system disposed on a transport craft, the system comprising:

an on-board network interface subsystem disposed on the transport craft to communicate via an on-board communication network with a plurality of client devices on the transport craft;

an on-board content management system (CMS) operative to provide media data to the plurality of client devices via the on-board network interface subsystem;

a sensor operative to measure a craft weight that is indicative of a number of passengers aboard the transport craft; and a transmitter in communication with at least one communication network component for transmission of the craft weight that is indicative of the number of passengers aboard the transport craft to the at least one communication network component of a communication network in communication with the transport craft, wherein the communication network comprises a satellite communication system and the satellite communication system is controlled to the transport craft based on the craft weight that is indicative of the number of passengers aboard the transport craft;

wherein the on-board CMS controls one or more characteristics of the media data based on the craft weight.

2. The on-board media system of claim 1, wherein the on-board CMS is activated when the number of passengers aboard the transport craft exceeds an activation threshold.

3. The on-board media system of claim 1, wherein the on-board CMS is deactivated when the number of passengers aboard the transport does not exceed the activation threshold.

4. The on-board media system of claim 1, wherein the communication network is controlled at least in part based on the craft weight that is indicative of the number of passengers aboard the transport craft.

5. The on-board media system of claim 1, wherein the at least one communication network component comprises a billing module, and wherein billing information regarding provision of the communication network to the transport craft is at least in part determined based on the craft weight that is indicative of the number of passengers aboard the transport craft.

6. The on-board media system of claim 1, wherein the craft weight is provided according to the Aeronautical Radio, Incorporated Standard.

7. A method for control of an on-board media system disposed on a transport craft, the method comprising:

measuring a craft weight with a sensor, wherein the craft weight is indicative of a number of passengers aboard the transport craft;

controlling an on-board content management system (CMS) to control providing media data to a plurality of client devices via an on-board network interface subsystem;

transmitting the craft weight that is indicative of the number of passengers aboard the transport craft to at least one communication network component of a communication network in communication with the transport craft; and allocating capacity of a satellite communication system of the communication network to the transport craft based on the craft weight that is indicative of the number of passengers aboard the transport craft.

8. The method of claim 7, wherein the controlling comprises: activating the on-board CMS when the number of passengers aboard the transport craft exceeds an activation threshold.

9. The method of claim 7, wherein the controlling comprises:

deactivating the on-board CMS when the number of passengers aboard the transport does not exceed the activation threshold.

10. The method of claim 7, further comprising:

controlling at least a portion of the communication network at least in part based on the craft weight that is indicative of the number of passengers aboard the transport craft.

11. The method of claim 7, wherein the at least one communication network component comprises a billing module, and further comprising:

determining billing information regarding provision of the communication network to the transport craft at least in part based on the craft weight that is indicative of the number of passengers aboard the transport craft.

* * * * *